United States Patent
Heath, Jr. et al.

(10) Patent No.: US 8,165,533 B2
(45) Date of Patent: Apr. 24, 2012

(54) APPARATUS AND METHOD FOR BEAMFORMING BASED ON GENERALIZED EIGEN-ANALYSIS IN MULTIPLE INPUT MULTIPLE OUTPUT WIRELESS COMMUNICATION SYSTEM

(75) Inventors: Robert Wendell Heath, Jr., Austin, TX (US); Chan-Byoung Chae, Austin, TX (US)

(73) Assignees: Samsung Electronics Co., Ltd., Suwon-si (KR); The Board of Regents of the University of Texas System, Austin, TX (US)

( * ) Notice: Subject to any disclaimer, the term of this patent is extended or adjusted under 35 U.S.C. 154(b) by 454 days.

(21) Appl. No.: 12/417,426

(22) Filed: Apr. 2, 2009

(65) Prior Publication Data

US 2009/0252250 A1    Oct. 8, 2009

(30) Foreign Application Priority Data

Apr. 2, 2008  (KR) .................. 10-2008-0030671

(51) Int. Cl.
*H04B 1/00* (2006.01)
(52) U.S. Cl. ............ 455/69; 455/68; 455/101; 455/522; 455/562.1; 370/208; 370/334; 370/336
(58) Field of Classification Search .................. 455/68, 455/69, 434, 509, 522, 524, 562.1; 370/208, 370/334, 336; 375/252, 260, 267, 347
See application file for complete search history.

(56) References Cited

U.S. PATENT DOCUMENTS

| | | | |
|---|---|---|---|
| 7,039,442 B1 * | 5/2006 | Joham et al. | 455/562.1 |
| 7,099,630 B2 * | 8/2006 | Brunner et al. | 455/69 |
| 7,313,417 B2 * | 12/2007 | Kim et al. | 455/562.1 |
| 7,729,439 B2 * | 6/2010 | Zhang et al. | 375/267 |
| 7,729,714 B2 * | 6/2010 | Black et al. | 455/522 |
| 7,738,925 B2 * | 6/2010 | Nguyen et al. | 455/562.1 |
| 7,933,560 B2 * | 4/2011 | Han et al. | 455/69 |
| 7,949,360 B2 * | 5/2011 | Han et al. | 455/522 |
| 7,953,176 B2 * | 5/2011 | Roh | 375/295 |
| 2003/0216156 A1 * | 11/2003 | Chun | 455/562.1 |
| 2004/0146024 A1 * | 7/2004 | Li et al. | 370/334 |
| 2006/0104382 A1 * | 5/2006 | Yang et al. | 375/267 |
| 2007/0071147 A1 * | 3/2007 | Sampath et al. | 375/347 |
| 2008/0273618 A1 * | 11/2008 | Forenza et al. | 375/261 |
| 2009/0016460 A1 * | 1/2009 | Hwang et al. | 375/267 |
| 2009/0215401 A1 * | 8/2009 | Yoon et al. | 455/67.14 |
| 2009/0232245 A1 * | 9/2009 | Lakkis | 375/267 |
| 2010/0056140 A1 * | 3/2010 | Hafeez | 455/434 |
| 2011/0105164 A1 * | 5/2011 | Lim et al. | 455/501 |

* cited by examiner

*Primary Examiner* — Linh Nguyen
(74) *Attorney, Agent, or Firm* — Jefferson IP Law, LLP (57) ABSTRACT

An apparatus and method for beamforming in a Multiple Input Multiple Output (MIMO) wireless communication system are provided. A Base Station (BS) includes a calculator for generating relational expressions between beamforming vectors of Mobile Stations (MSs) using channel information of each MS, for determining beamforming vector candidates of each MS from the relational expressions using generalized Eigen-analysis, and for selecting beamforming vectors for each MS from the beamforming vector candidates, and a plurality of Transmit (Tx) beamformers for performing Tx beamforming on dedicated pilot symbols to be transmitted to each MS using the beamforming vectors for each MS.

34 Claims, 6 Drawing Sheets

APPARATUS AND METHOD FOR BEAMFORMING BASED ON GENERALIZED EIGEN-ANALYSIS IN MULTIPLE INPUT MULTIPLE OUTPUT WIRELESS COMMUNICATION SYSTEM

PRIORITY

The present application claims the benefit under 35 U.S.C. §119(a) of a Korean patent application filed in the Korean Intellectual Property Office on Apr. 2, 2008 and assigned Serial No. 10-2008-0030671, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co. Ltd. and The Board of Regents of the University of Texas System.

BACKGROUND OF THE INVENTION

1. Field of the Invention The present invention relates to a Multiple Input Multiple Output (MIMO) wireless communication system. More particularly, the present invention relates to an apparatus and method for performing beamforming in a MIMO wireless communication system.

2. Description of the Related Art

With the growing demand for high-speed, high-quality data transmission, a Multiple Input Multiple Output (MIMO) wireless communication scheme using a plurality of Transmit (Tx)/Receive (Rx) antennas has drawn attention as one technique that is capable of satisfying such a demand. In the MIMO scheme, communication can be performed using a plurality of streams through a plurality of antennas. Therefore, in comparison with the conventional technique using a single antenna, channel capacity can be significantly increased when using the MIMO scheme. For example, if a transmitting end and a receiving end use M Tx antennas and M Rx antennas, a channel between the antennas is independent, and a bandwidth and entire Tx power are fixed, then an average channel capacity is increased M times higher than the case of using the single antenna.

The MIMO scheme can be classified into a Single User MIMO (SU MIMO) and a Multiple User MIMO (MU MIMO). The SU MIMO denotes the use of a pair of transmitting/receiving ends to perform one-to-one communication by occupying all of a plurality of channels created by a plurality of antennas. The MU MIMO denotes the divided use of the plurality of channels created by the plurality of antennas to perform communication between the transmitting/receiving ends having a one-to-one relation.

When one Base Station (BS) and a plurality of Mobile Stations (MSs) perform communication simultaneously according to the MIMO scheme, Tx signals or Rx signals of the respective MSs are mixed in a plurality of channels. In this case, the BS and the plurality of MSs can distinguish the signals of the respective MSs by performing precoding on the Tx signals or by performing post-processing on the Rx signals. The precoding is an operation in which the Tx signal is multiplied by a Tx beamforming vector. The post-processing is an operation in which the Rx signal is multiplied by an Rx beamforming vector. For this, the BS determines the Tx beamforming vector and the Rx beamforming vector for the BS and each MS. The Tx beamforming vector and the Rx beamforming vector should satisfy a condition in which there is no interference between the MSs after Rx beamforming. Accordingly, there is a need for a method of determining an optimal Tx beamforming vector and an optimal Rx beamforming vector to perform effective spatial multiple access communication in the MIMO wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for determining a Transmit (Tx) beamforming vector and a Receive (Rx) beamforming vector to perform spatial multiple access communication in a Multiple Input Multiple Output (MIMO) wireless communication system.

Another aspect of the present invention is to provide an apparatus and method for determining a beamforming vector by generalized Eigen-analysis in a MIMO wireless communication system.

Yet another aspect of the present invention is to provide an apparatus and method for delivering channel information required to determine a beamforming vector of a Base Station (BS) in a MIMO wireless communication system.

Still another aspect of the present invention is to provide an apparatus and method for determining a beamforming vector by a Mobile Station (MS) in a MIMO wireless communication system.

In accordance with an aspect of the present invention, a BS apparatus in a MIMO wireless communication system is provided. The apparatus includes a calculator for determining relational expressions between beamforming vectors of MSs using channel information of each MS, for determining beamforming vector candidates of each MS from the relational expressions using generalized Eigen-analysis, and for determining beamforming vectors for each MS from the beamforming vector candidates, and a plurality of Tx beamformers for performing Tx beamforming on dedicated pilot symbols to be transmitted to each MS using the beamforming vectors for each MS.

In accordance with another aspect of the present invention, an MS apparatus in a MIMO wireless communication system is provided. The apparatus includes an estimator for estimating an effective channel of a BS using beamformed dedicated pilot symbols, a calculator for determining an Rx beamforming vector of the MS using the effective channel, and an Rx beamformer for performing Rx beamforming on Rx symbols using the Rx beamforming vector.

In accordance with yet another aspect of the present invention, a method of operating a BS in a MIMO wireless communication system is provided. The method includes determining relational expressions between beamforming vectors of MSs using channel information of each MS, determining beamforming vector candidates of each MS from the relational expressions using generalized Eigen-analysis, determining beamforming vectors for each MS from the beamforming vector candidates, and performing Tx beamforming on dedicated pilot symbols to be transmitted to each MS using the beamforming vectors for each MS.

In accordance with still another aspect of the present invention, a method of operating an MS in a MIMO wireless communication system is provided. The method includes estimating an effective channel of a BS using beamformed dedicated pilot symbols, determining an Rx beamforming vector of the MS using the effective channel, and performing Rx beamforming on Rx symbols using the Rx beamforming vector.

Other aspects, advantages and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention described below relates to a technique for determining a Transmit (Tx) beamforming vector and a Receive (Rx) beamforming vector to perform spatial multiple access communication in a Multiple Input Multiple Output (MIMO) wireless communication system. Although an Orthogonal Frequency Division Multiplexing (OFDM)/ Orthogonal Frequency Division Multiple Access (OFDMA)-based wireless communication system will be described hereinafter as an example, the present invention may also equally apply to other types of wireless communication systems.

A process of determining a beamforming vector by a Base Station (BS) will be described below using Equations.

When considering downlink communication using the Tx beamforming vector and the Rx beamforming vector, an Rx signal after Rx beamforming can be expressed by Equation (1) below.

$$y_k = w_k^H H_k m_k x_k + W_k^H H_k \sum_{l=1, l \neq k}^{K} m_l x_l + W_k^H n_k \qquad (1)$$

In Equation (1) above, $y_k$ denotes an Rx signal after Rx beamforming of a Mobile Station (MS) k, $w_k^H$ denotes an Rx beamforming vector of the MS k, $H_k$ denotes a downlink channel matrix between the MS k and the BS, $m_k$ denotes a Tx beamforming vector for the MS k, $x_k$ denotes a Tx signal to be transmitted to the MS k, K denotes the number of MSs that concurrently perform communication, and $n_k$ denotes noise in a downlink channel between the MS k and the BS.

Herein, the Rx beamforming vector of the MS k should be delivered from the BS to the MS k. For this, the BS performs beamforming on a dedicated pilot symbol of the MS k using the Tx beamforming vector for the MS k, and thereafter transmits the beamformed dedicated pilot symbol. Accordingly, the MS k estimates an effective channel using the beamformed dedicated pilot signal, and determines an Rx beamforming vector from the estimated effective channel. The effective channel is expressed by Equation (2) below.

$$w_k = H_k m_k \qquad (2)$$

In Equation (2) above, $w_k$ denotes a downlink effective channel between the MS k and the BS, $H_k$ denotes a downlink channel matrix between the MS k and the BS, and $m_k$ denotes a Tx beamforming vector for the MS k.

By determining the Rx beamforming vector as described above, the BS determines an optimal Tx beamforming vector for each MS according to Equation (3) below under the assumption that communication is performed with two MSs.

$$m_{1,opt} = \arg\max_{m_1:\|m_1\|=1} |m_1^H H_1^H H_1 m_1|^2 \quad (3)$$

$$m_{2,opt} = \arg\max_{m_2:\|m_2\|=1} |m_2^H H_2^H H_2 m_2|^2$$

In Equation (3) above, $m_{k,opt}$ denotes an optimal Tx beamforming vector for the MS k, $H_k$ denotes a downlink channel matrix between the MS k and the BS, and $m_k$ denotes a Tx beamforming vector for the MS k.

Equation (3) above should satisfy constraints expressed by Equation (4) below.

$$|m_1^H H_1^H H_1 m_2|=0, \; |m_2^H H_2^H H_2 m_1|=0 \quad (4)$$

In Equation (4) above, $H_k$ denotes a downlink channel matrix between the MS k and the BS, and $m_k$ denotes a Tx beamforming vector for the MS k.

By using the constraints of Equation (4) above, the BS can generate relational expressions between Tx beamforming vectors for the respective MSs, as expressed by Equation (5) below.

$$m_2^H[H_2^H H_2 m_1 - \lambda_1 H_1^H H_1 m_1]=0 \quad (5)$$

In Equation (5) above, $H_k$ denotes a downlink channel matrix between the MS k and the BS, $m_k$ denotes a Tx beamforming vector for the MS k, and $\lambda_1$ denotes an unknown value that is a division between two constants $a_1$ and $b_1$.

Since the Tx beamforming vector is not a zero vector, Equation (5) above can be simplified into Equation (6) below.

$$H_2^H H_2 m_1 - \lambda_1 H_1^H H_1 m_1 = 0 \quad (6)$$

In Equation (6) above, $H_k$ denotes a downlink channel matrix between the MS k and the BS, $m_k$ denotes a Tx beamforming vector for the MS k, and $\lambda_1$ denotes an unknown value that is a division between two constants $a_1$ and $b_1$.

Similar to Equation (5) and Equation (6) above, another relational expression can be generated by Equation (7) below.

$$H_1^H H_1 m_2 - \lambda_2 H_2^H H_2 m_2 = 0 \quad (7)$$

In Equation (7) above, $H_k$ denotes a downlink channel matrix between the MS k and the BS, $m_k$ denotes a Tx beamforming vector for the MS k, and $\lambda_2$ denotes an unknown value that is a division between two constants $a_2$ and $b_2$.

Equation (6) and Equation (7) can be summarized by Equation (8) below.

$$R_2 m_1 = \lambda_1 R_1 m_1$$

$$R_1 m_2 = \lambda_2 R_2 m_2 \quad (8)$$

In Equation (8) above, $R_k$ denotes a product between a Hermitian matrix of a channel matrix of the MS k and the channel matrix of the MS k, $m_k$ denotes a Tx beamforming vector for the MS k, and $\lambda_k$ denotes an unknown value that is a division between two constants $a_k$ and $b_k$.

In Equation (8) above, the determination of $m_1$ and $m_2$ is performed in substantially the same manner as the determination of generalized eigenvectors of $R_1$ and $R_2$. Further, if $R_1$ and $R_2$ have an inverse matrix, the determination of $m_1$ and $m_2$ is performed in substantially the same manner as the determination of eigenvectors of $R_1^{-1}R_2$ and $R_2^{-1}R_1$. The determination of the generalized eigenvectors and the determination of the eigenvectors are performed according to a well-known mathematical procedure. Thus, detailed descriptions thereof will be omitted.

As described above, through generalized Eigen-analysis, the BS can determine Tx beamforming vector candidates for an MS 1 and Tx beamforming vector candidates for an MS 2. However, the Tx beamforming vector candidates determined through the generalized Eigen-analysis are Tx beamforming vectors considering only the constraints of Equation (4) above. In other words, the Tx beamforming vector candidates are Tx beamforming vectors considering only signal interference between the MSs. Therefore, the BS selects an optimal Tx beamforming vector for each MS from the Tx beamforming vector candidates for each MS so that the selected optimal Tx beamforming vector maximizes a sum rate. For example, a criterion for selecting the optimal Tx beamforming vector for each MS can be expressed by Equation (9) below.

$$(m_1, m_2) = \quad (9)$$

$$\arg\max_{(v_{1,n}, v_{2,n}), n,m \in \{1,\ldots,N_t\}} \left\{ \log_2\left(1 + \frac{\frac{P_1}{\sigma^2}|v_{1,n}^H R_1 v_{1,n}|^2}{\frac{P_1}{\sigma^2}|v_{1,n}^H R_1 v_{2,m}|^2 + 1}\right) + \log_2\left(1 + \frac{\frac{P_2}{\sigma^2}|v_{2,n}^H R_2 v_{2,m}|^2}{\frac{P_2}{\sigma^2}|v_{2,n}^H R_2 v_{1,n}|^2 + 1}\right) \right\}$$

In Equation (9) above, $m_k$ denotes a Tx beamforming vector for the MS k, $N_t$ denotes the number of Tx antennas, $P_k$ denotes power allocated to the MS k, $\sigma^2$ denotes noise power, and $R_k$ denotes a product between a Hermitian matrix of a channel matrix of the MS k and the channel matrix of the MS k. A sum of powers respectively allocated to the two MSs should be equal to a total Tx power of the BS.

As described above, the BS selects the optimal Tx beamforming vector for each MS according to the generalized Eigen-analysis and the criterion of Equation (9) above. In this case, the BS should know a matrix R that is a product between a Hermitian matrix of a channel matrix of each MS and the channel matrix. The matrix R is a matrix generated from a downlink channel matrix of the MS, and thus the BS can configure the matrix R using the channel matrix.

When a system follows a Time Division Duplex (TDD) scheme, substantially the same band is used in uplink and downlink, and thus an uplink channel matrix is substantially identical to a downlink channel matrix. Therefore, according to an exemplary implementation of the present invention for obtaining information indicating the matrix R by the BS, the BS estimates the uplink channel matrix using a sounding channel, and then configures the matrix R. That is, the MS transmits a sounding signal for channel estimation through a pre-agreed sounding channel, and estimates an uplink channel using the sounding signal.

According to another exemplary implementation of the present invention for obtaining information indicating the matrix R by the BS, the MS feeds back control information indicating the matrix R to the BS. In this case, the MS uses a characteristic of the matrix R to indicate the matrix R with a minimum amount of information. First, the characteristic of the matrix R will be described. The matrix R is a Hermitian matrix of a single norm. Diagonal elements of the matrix R are all real numbers, and a total sum of the diagonal elements is 1. Further, non-diagonal elements of the matrix R are complex numbers, and an $(n,m)^{th}$ element of the matrix R is identical to an $(m,n)^{th}$ element thereof. Therefore, the MS feeds back values of the remaining elements other than one element of the diagonal elements of the matrix R, and feeds back values of upper triangular elements or lower triangular elements of the non-diagonal elements.

For example, if the matrix R is a 2×2 matrix, the matrix R is expressed by Equation (10) below.

$$R = \begin{bmatrix} \alpha & \beta + j\gamma \\ \beta - j\gamma & 1 - \alpha \end{bmatrix} \quad (10)$$

In Equation (10) above, R denotes a product between a Hermitian matrix of a channel matrix and the channel matrix, and $\alpha$, $\beta$, and $\gamma$ denote arbitrary real numbers.

As expressed by Equation (10) above, if the matrix R is a 2×2 matrix, the information indicating the matrix R can be obtained using three values $\alpha$, $\beta$, and $\gamma$. Therefore, if the matrix R is a 2×2 matrix, the MS feeds back only the three values $\alpha$, $\beta$, and $\gamma$.

To feed back the information indicating the matrix R to the BS, the MSs quantize the values of the remaining elements other than one element of the diagonal elements of the matrix R and the values of upper triangular elements and lower triangular elements of the non-diagonal elements. In this case, a real part and an imaginary part of each element to be fed back are independently quantized. A value of each diagonal element of the matrix R has a probability cumulative distribution function expressed by Equation (11).

$$F_{R_{mm}}(x) = \frac{B(x; N_r, (N_t - 1)N_r)}{B(N_r, (N_t - 1)N_r)} \quad (11)$$

In Equation (11) above, $R_{mm}$ denotes an $(m,m)^{th}$ element of the matrix R, $F_{R_{mm}}(X)$ denotes a probability cumulative distribution function for a value of the $(m,m)^{th}$ element of the matrix R, $B(x;a,b)$ denotes an incomplete beta function for x, $N_r$ denotes the number of Rx antennas of the MS, and $N_t$ denotes the number of Tx antennas of the BS.

The incomplete beta function in Equation (11) above is defined by Equation (12) below.

$$B(x;a,b) = \int_0^x t^{a-1}(1-t)^{b-1} dt \quad (12)$$

In Equation (12) above, $B(x;a,b)$ denotes an incomplete beta function for x.

Since distribution of the value $R_{mm}$ is determined by Equation (11) above, the MS considers the probability cumulative distribution function so that quantization levels are densely set in a region having a high distribution of the value $R_{mm}$. As a result, a quantization error is reduced. That is, a difference between the quantization levels in a region having a high probability distribution is set to a relatively small value instead of identically setting the difference between the quantization levels, and thus the quantization error is reduced. For example, the quantization levels for quantization of the $R_{mm}$ can be set by Equation (13) below.

$$I(c_i, N_r, (N_t - 1)N_r) - I(c_{i-1}, N_r, (N_t - 1)N_r) = \frac{1}{2^{N_b} + 1} \quad (13)$$

In Equation (13) above, $I(x;a,b)$ denotes a normalized beta function for x, $c_i$ denotes an $i^{th}$ quantization level, $N_r$ denotes the number of Rx antennas of the MS, $N_t$ denotes the number of Tx antennas of the BS, and $N_b$ denotes a total number of bits used in quantization.

The normalized beta function in Equation (13) above is defined by Equation (14) below.

$$I(x; N_r, (N_t - 1)N_r) = \sum_{j=N_r}^{N_t N_r} \frac{(N_t N_r - 1)!}{j!(N_t N_r - 1 - j)!} x^j (1-s)^{N_t N_r - 1 - j} \quad (14)$$

In Equation (14) above, $I(x;N_r(N_t-1)N_r)$ denotes a normalized beta function for x.

A value of each diagonal element of the matrix R is in the range of 0 to 1. Values of an imaginary part and a real part of each non-diagonal element are in the range of −0.5 to 0.5. Therefore, an imaginary-part probability cumulative distribution function and a real-part probability cumulative distribution function of the non-diagram elements have a distribution form in that a probability distribution function of the diagonal elements is shifted by 0.5 in a negative direction on an x-axis. That is, the non-diagonal elements have substantially the same distribution form as that of the diagonal elements except for the range of values. Thus, the quantization levels for quantization of the non-diagonal elements can also be determined as expressed by Equation (13) above. In this case, the quantization levels of the real part are substantially the same as those of the imaginary part.

When the quantization levels are determined as described above, the BS and the MSs should obtain information of the determined quantization levels. For this, the BS and the MSs determine the quantization levels using Equation (11) to Equation (14) above. Alternatively, the BS determines the quantization levels using Equation (11) to Equation (14) above, and transmits control information containing the determined quantization level information to the MSs.

The process of determining a beamforming vector has been described above by considering downlink communication. However, if an uplink channel and a downlink channel follow substantially the same TDD scheme, a Tx beamforming vector of the BS, determined for downlink communication, may be used as an Rx beamforming vector for uplink communication, and an Rx beamforming vector of the MS, determined for downlink communication, may be used as a Tx beamforming vector for uplink communication.

In case of using a Frequency Division Duplex (FDD) scheme, the matrix R may be configured using an uplink channel matrix to determine a beamforming vector for uplink communication. In this case, the BS estimates an uplink channel matrix, and configures the matrix R using the uplink channel matrix. Thereafter, the BS determines an Rx beamforming vector of the BS and a Tx beamforming vector of the MS for uplink transmission according to the aforementioned process.

Hereinafter, structures of a BS and an MS for determining beamforming vectors according to the aforementioned process will be described in more detail with reference to the accompanying drawings.

Figure 1:
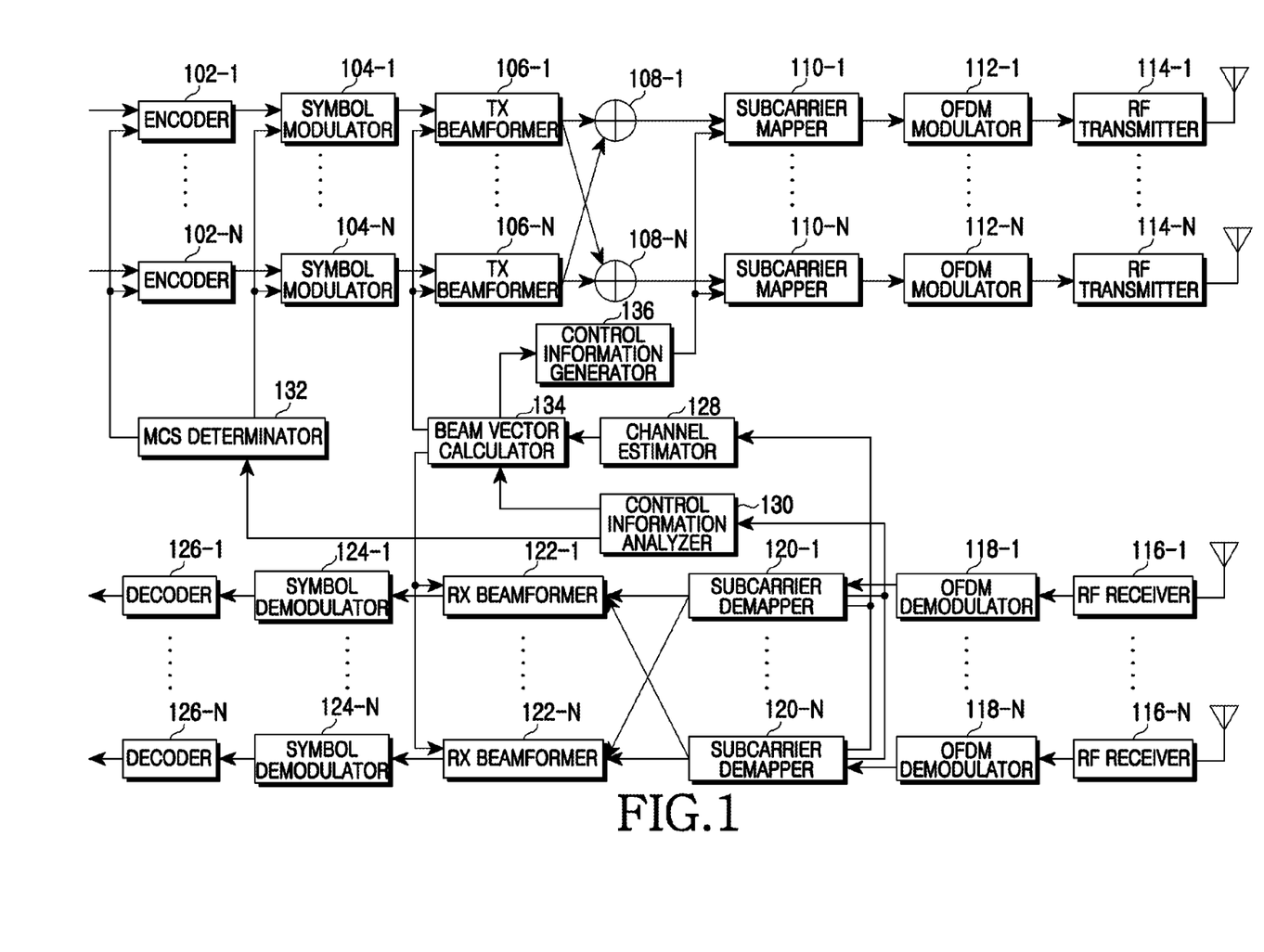
FIG. 1 is a block diagram illustrating a structure of a Base Station (BS) in a Multiple Input Multiple Output (MIMO) wireless communication system according to an exemplary embodiment of the present invention.

FIG. 1 is a block diagram illustrating a structure of a BS in a MIMO wireless communication system according to an exemplary embodiment of the present invention.

Referring to FIG. 1, the BS includes a plurality of encoders 102-1 to 102-N, a plurality of symbol modulators 104-1 to 104-N, a plurality of Tx beamformers 106-1 to 106-N, a plurality of adders 108-1 to 108-N, a plurality of subcarrier mappers 110-1 to 110-N, a plurality of OFDM modulators 112-1 to 112-N, a plurality of Radio Frequency (RF) transmitters 114-1 to 114-N, a plurality of RF receivers 116-1 to 116-N, a plurality of OFDM demodulators 118-1 to 118-N, a plurality of subcarrier demappers 120-1 to 120-N, a plurality of Rx beamformers 122-1 to 122-N, a plurality of symbol demodulators 124-1 to 124-N, a plurality of decoders 126-1 to 126-N, a channel estimator 128, a control information analyzer 130, a Modulation and Coding Scheme (MCS) determinator 132, a beam vector calculator 134, and a control information generator 136.

Each of the encoders 102-1 to 102-N performs channel encoding on a bit-stream to be transmitted through its corresponding Tx stream. Each of the symbol modulators 104-1 to 104-N modulates the encoded bit-stream provided from its corresponding encoder 102, and thus converts the encoded bit-stream into complex symbols. Each of the Tx beamformers 106-1 to 106-N performs Tx beamforming on symbols to be transmitted through its corresponding Tx stream. Herein, one stream is assigned to one MS, and each of the Tx beamformers 106-1 to 106-N performs beamforming using a Tx beamforming vector for the MS allocated with its corresponding Tx stream. In this case, one Tx symbol is converted into a Tx symbol vector having a specific number of elements by performing beamforming, wherein the specific number corresponds to the number of Tx antennas of the BS. Further, each of the Tx beamformers 106-1 to 106-N outputs symbols included in the Tx signal vector distributively to the adders 108-1 to 108-N. However, if a Tx beamforming vector for each MS is determined by the beam vector calculator 134, the Tx beamformers 106-1 to 106-N perform Tx beamforming on a dedicated pilot symbol of each MS. After transmitting the beamformed dedicated pilot symbol, the Tx beamformers 106-1 to 106-N perform Tx beamforming on data symbols provided from the symbol modulators 104-1 to 104-N.

Each of the adders 108-1 to 108-N adds symbols provided from the Tx beamformers 106-1 to 106-N. Each of the subcarrier mappers 110-1 to 110-N maps symbols provided from its corresponding adder 108 to subcarriers. Each of the OFDM modulators 112-1 to 112-N converts per-subcarrier symbols provided from its corresponding subcarrier mapper 110 into time-domain signals by performing an Inverse Fast Fourier Transform (IFFT) operation, and configures an OFDM symbol by inserting a Cyclic Prefix (CP). Each of the RF transmitters 114-1 to 114-N up-converts baseband OFDM symbols provided from its corresponding OFDM modulator 112 into RF signals, and transmits the RF signals through antennas.

Each of the RF receivers 116-1 to 116-N down-converts an RF signal received through its corresponding antenna into a baseband signal. Each of the OFDM demodulators 118-1 to 118-N divides a baseband signal provided from its corresponding RF receiver 116 in an OFDM symbol unit, removes a CP, and restores per-subcarrier symbols by performing a Fast Fourier Transform (FFT) operation.

Each of the subcarrier demappers 120-1 to 120-N classifies the per-subcarrier symbols provided from its corresponding OFDM demodulator 118 according to a processing path. For example, each of the subcarrier demappers 120-1 to 120-N provides symbols, which are received from MSs performing communication according to a spatial multiple access scheme, to the Rx beamformers 122-1 to 122-N. Further, each of the subcarrier demappers 120-1 to 120-N provides symbols mapped to a sounding channel to the channel estimator 128. Furthermore, each of the subcarrier demappers 120-1 to 120-N provides symbols indicating control information to the control information analyzer 130.

Each of the Rx beamformers 122-1 to 122-N performs Rx beamforming on an Rx symbol vector which is provided from the subcarrier demappers 120-1 to 120-N after being received from the MSs performing communication according to the spatial multiple access scheme. In other words, each of the Rx beamformers 122-1 to 122-N multiplies the provided Rx symbol vector by an Rx beamforming vector for the MS allocated with the corresponding stream.

Each of the symbol demodulators 124-1 to 124-N demodulates symbols provided from its corresponding Rx beamformer 122, and thus converts the symbols into a bit-stream. Each of the decoders 126-1 to 126-N performs channel decoding on the bit-stream provided from its corresponding symbol demodulator 124.

The channel estimator 128 estimates uplink channel matrixes for the respective MSs using sounding signals received from the MSs. Further, the channel estimator 128 provides information on the estimated uplink channel matrix to the beam vector calculator 134. If the BS and the MSs follow the TDD scheme, the channel estimator 128 measures uplink channel quality information, and provides the measured channel quality information to the MCS determinator 132.

The control information analyzer 130 converts symbols of control information into a bit-stream, and analyzes the control information received from the MSs. For example, the control information analyzer 130 evaluates downlink channel quality information fed back from the MSs, and provides the downlink channel quality information to the MCS determinator 132. In an exemplary implementation, the control information analyzer 130 evaluates downlink channel information fed back from the MSs. The channel information is information indicating a matrix R that is a product between a Hermitian matrix of a downlink channel matrix of each MS and the downlink channel matrix. Herein, the information indicating the matrix R may include only values of some elements of the matrix R. In this case, the control information analyzer 130 restores values of all elements of the matrix R according to a characteristic of the matrix R, and thereafter provides information indicating the matrix R to the beam vector calculator 134.

The MCS determinator 132 determines a coding scheme to be used by the encoders 102-1 to 102-N and a modulation scheme to be used by the symbol modulators 104-1 to 104-N according to the downlink channel quality information provided from the channel estimator 128.

The beam vector calculator 134 determines beamforming vectors using uplink channel matrix information provided from the channel estimator 128 and the matrix-R information provided from the control information analyzer 130. If the uplink channel matrix information is used, the beam vector calculator 134 configures the matrix R using the uplink channel matrix to determine an uplink beamforming vector. An exemplary process of determining a beamforming vector using the matrix will now be described. First, the beam vector calculator 134 determines relational expressions between beamforming vectors using the matrix R according to a constraint between beamforming vectors of each MS. For example, when two MSs are considered, the relational expressions are substantially the same as shown in Equation (8) above. Further, the beam vector calculator 134 determines beamforming vector candidates of each MS from the relational expressions using the generalized Eigen-analysis. Thereafter, the beam vector calculator 134 determines a beamforming vector for each MS among the beamforming vector candidates of each MS. In this case, the beamforming vector determined by the beam vector calculator 134 maximizes a sum rate. For example, when two MSs are considered, the beam vector calculator 134 determines the beamforming vector for each MS according to Equation (9) above.

In this case, if the matrix R in use is generated from a downlink channel matrix, that is, if the matrix R is provided from the control information analyzer 130, the beamforming vector for each MS is a Tx beamforming vector. If the matrix R in use is generated from an uplink channel matrix, that is, if the matrix R is provided from the channel estimator 128, the beamforming vector for each MS is an Rx beamforming vector. Therefore, if the BS and the MSs follow the TDD scheme, since an uplink channel and a downlink channel are identical in the TDD scheme, the beam vector calculator 134 determines beamforming vectors to be used both in Tx beamforming and Rx beamforming using only one of a matrix R generated from the downlink channel matrix and a matrix R generated from the uplink channel matrix. On the other hand, if the BS and the MSs follow the FDD scheme, the beam vector calculator 134 determines Tx beamforming vectors using the matrix R generated from the downlink channel matrix and determines Rx beamforming vectors using the matrix R generated from the uplink channel matrix. In addition, if the BS and the MSs follow the FDD scheme, the beam vector calculator 134 determines a Tx beamforming vector to be used by each MS in uplink communication.

According to the aforementioned operations, an uplink Rx beamforming vector for each MS and a downlink Tx beamforming vector for each MS are determined. Thereafter, the beam vector calculator 134 provides the uplink Rx beamforming vector for each MS to the Rx beamformers 122-1 to 122-N, and provides the downlink Tx beamforming vector for each MS to the Tx beamformers 106-1 to 106-N. Further, the beam vector calculator 134 provides the Tx beamforming vector to be used by each MS to the control information generator 136.

The control information generator 136 generates control information to be transmitted to the MSs. In an exemplary implementation, the control information generator 136 generates control information including Tx beamforming vector information to be used by each MS. Further, the control information generator 136 configures the control information into symbols, and provides the symbols indicating the control information to the subcarrier mappers 110-1 to 110-N.

In the structure of the BS of FIG. 1, Tx antennas and Rx antennas are separately present. However, N Tx antennas and N Rx antennas may be constructed with N common Tx/Rx antennas. In this case, the RF transmitter 113 and the RF receiver 116 respectively connected with the TX antennas and the Rx antennas are connected to those antennas through a duplexer.

Figure 2:
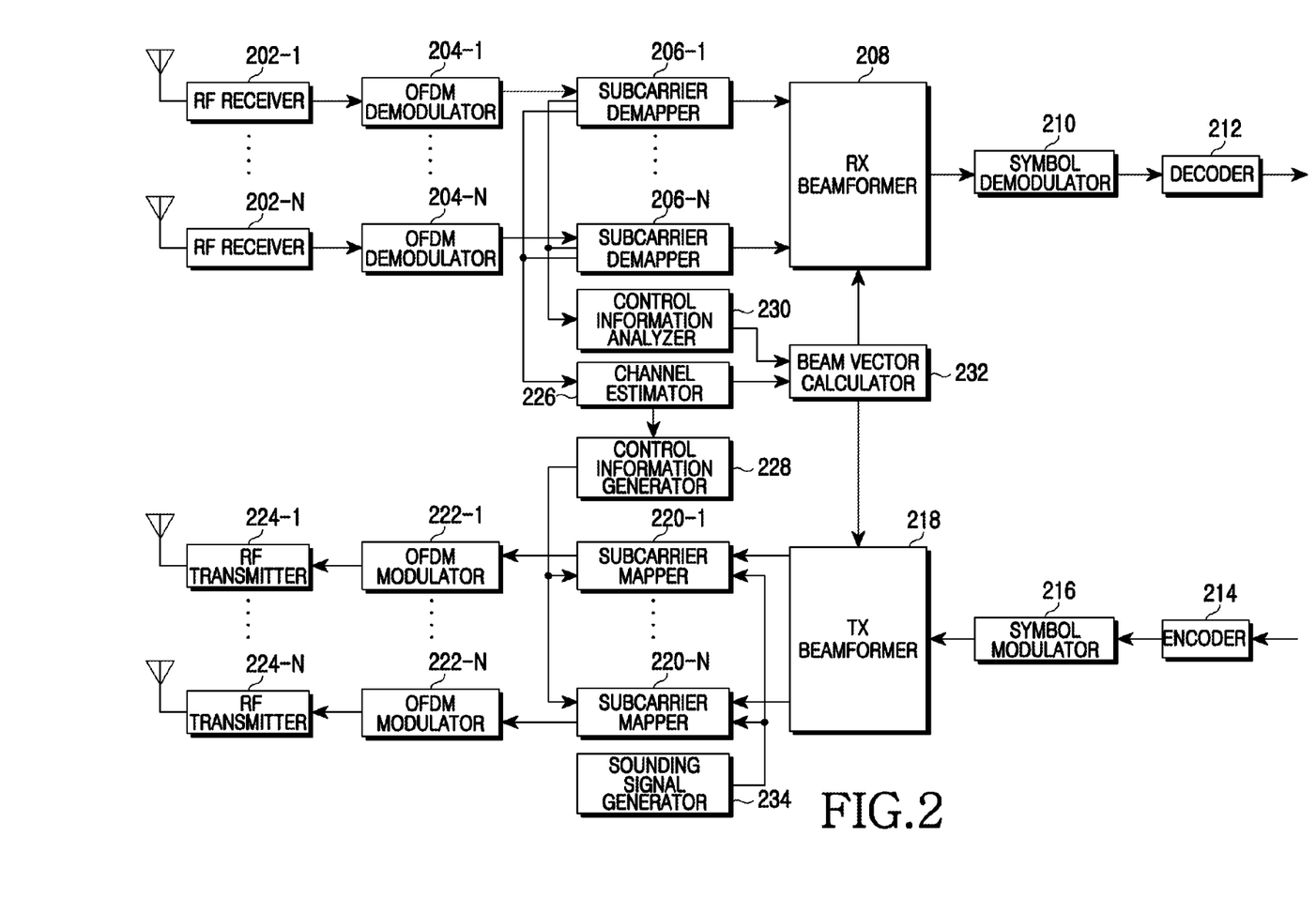
FIG. 2 is a block diagram illustrating a structure of a Mobile Station (MS) in a MIMO wireless communication system according to an exemplary embodiment of the present invention.

FIG. 2 is a block diagram illustrating a structure of an MS in a MIMO wireless communication system according to an exemplary embodiment of the present invention.

Referring to FIG. 2, the MS includes a plurality of RF receivers 202-1 to 202-N, a plurality of OFDM demodulators 204-1 to 204-N, a plurality of subcarrier demappers 206-1 to 206-N, an Rx beamformer 208, a symbol demodulator 210, a decoder 212, an encoder 214, a symbol modulator 216, a Tx beamformer 218, a plurality of subcarrier mappers 220-1 to 220-N, a plurality of OFDM modulators 222-1 to 222-N, a plurality of RF transmitters 224-1 to 224-N, a channel estimator 226, a control information generator 228, a control information analyzer 230, a beam vector calculator 232, and a sounding signal generator 234.

Each of the RF receivers 202-1 to 202-N down-converts an RF signal received through its corresponding antenna into a baseband signal. Each of the OFDM demodulators 204-1 to 204-N divides the baseband signal provided from its corresponding RF receiver 202 in an OFDM symbol unit, removes a CP, and restores per-subcarrier symbols by performing an FFT operation. Each of the subcarrier demappers 206-1 to 206-N classifies symbols provided from its corresponding OFDM demodulator 204 according to a processing path. For example, each of the subcarrier demappers 206-1 to 206-N extracts symbols mapped to resources allocated to the MS and provides the extracted symbols to the Rx beamformer 208. Further, each of the subcarrier demappers 206-1 to 206-N extracts a non-beamformed pilot signal and a beamformed dedicated pilot signal and provides the extracted signals to the channel estimator 226. Furthermore, each of the subcarrier demappers 206-1 to 206-N provides symbols indicating control information to the control information analyzer 230.

The Rx beamformer 208 performs Rx beamforming on an Rx symbol vector provided from the subcarrier demappers 206-1 to 206-N. That is, the Rx beamformer 208 multiplies the Rx symbol vector by the Rx beamforming vector provided from the beam vector calculator 232. The symbol demodulator 210 demodulates symbols provided from the Rx beamformer 208 and thus converts the symbols into a bit-stream. The decoder 212 performs channel decoding on the bit-stream provided from the symbol demodulator 210.

The encoder 214 performs channel encoding on the bit-stream to be transmitted. The symbol modulator 216 modulates the encoded bit-stream provided from the encoder 214 and thus converts the encoded bit-stream into complex symbols. The Tx beamformer 218 performs Tx beamforming on symbols to be transmitted. That is, the Tx beamformer 218 multiplies the symbol to be transmitted by the Tx beamforming vector provided from the beam vector calculator 232.

The subcarrier mappers 220-1 to 220-N map the Tx symbol vector provided from the Tx beamformer 218 to resources allocated to the MS. Further, the subcarrier mappers 220-1 to 220-N map a sounding signal provided from the sounding signal generator 234 to a sounding channel. Furthermore, the subcarrier mappers 220-1 to 220-N map symbols of control information indicating a matrix R provided from the control information generator 228 to a resource allocated for control information transmission. If the MS and the BS follow the TDD scheme, it is possible to skip any one of an operation of mapping symbols of information indicating the matrix R and an operation of mapping the sounding signal, where the operations are performed by the subcarrier mappers 220-1 to 220-N.

Each of the OFDM modulators 222-1 to 222-N converts per-subcarrier symbols provided from its corresponding subcarrier mapper 220 into a time-domain signal by performing an IFFT operation, and configures an OFDM symbol by inserting a CP. Each of the RF transmitters 224-1 to 224-N up-converts baseband OFDM symbols provided from its corresponding OFDM modulator 222 into an RF signal, and thereafter transmits the RF signal through its corresponding antenna.

The channel estimator 226 estimates a downlink channel matrix of the BS using a pilot symbol or a preamble signal provided from the subcarrier demappers 206-1 to 206-N. Further, in order to feed back channel information to the BS, the channel estimator 226 provides downlink channel matrix information of the BS to the control information generator 228. In addition, the channel estimator 226 estimates a downlink effective channel of the BS using a beamformed dedicated pilot symbol provided from the subcarrier demappers 206-1 to 206-N. Further, in order to determine a beamforming vector, the channel estimator 226 provides information on the downlink effective channel to the beam vector calculator 232.

The control information generator 228 generates control information to be transmitted to the BS. In an exemplary implementation, the control information generator 228 generates channel information to be fed back to the BS. Herein, the channel information includes information indicating a matrix R which is obtained by multiplying a Hermitian matrix of the downlink channel matrix and the downlink channel matrix. In this case, the control information generator 228 generates control information indicating the matrix R with a minimum amount of information according to a characteristic of the matrix R. In other words, the control information generator 228 generates control information including values of the remaining elements other than one element of the diagonal elements of the matrix R and including values of upper triangular elements or lower triangular elements of the non-diagonal elements. Further, the control information generator 228 configures the generated control information into symbols, and provides the symbols indicating the control information to the subcarrier mappers 220-1 to 220-N. If the MS and the BS follow the TDD scheme, it is possible to skip the operation performed by the control information generator 228 to generate the control information indicating the matrix R.

The control information analyzer 230 analyzes control information received from the BS to evaluate content of the control information. For example, the control information analyzer 230 determines a Tx beamforming vector of the MS using the control information received from the BS. That is, when the MS and the BS follow the FDD scheme, a Tx beamforming vector used in uplink communication is different from an Rx beamforming vector used in downlink transmission. Therefore, unlike in a case where the MS and the BS follow the TDD scheme, the Tx beamforming vector is evaluated using the control information received from the BS.

The beam vector calculator 232 determines an Rx beamforming vector and a Tx beamforming vector, provides the Rx beamforming vector to the Rx beamformer 208, and provides the Tx beamforming vector to the Tx beamformer 218. If the MS and the BS follow the TDD scheme, the beam vector calculator 232 determines the Rx beamforming vector and the Rx beamforming vector using the downlink effective channel information provided from the channel estimator 226. That is, the beam vector calculator 232 determines the Rx beamforming vector and the Tx beamforming vector by determining a Hermitian matrix of the downlink effective channel. On the other hand, if the MS and the BS follow the FDD scheme, the beam vector calculator 232 determines the Rx beamforming vector using the downlink effective channel information provided from the channel estimator 226, and uses Tx beamforming vector information provided from the control information analyzer 230.

The sounding signal generator 234 generates a sounding signal to estimate an uplink channel of the BS, and provides the sounding signal to the subcarrier mappers 220-1 to 220-N.

In the structure of the MS of FIG. 2, Tx antennas and Rx antennas are separately present. However, N Tx antennas and N Rx antennas may be constructed with N common Tx/Rx antennas. In this case, the RF transmitter 224 and the RF receiver 202 respectively connected with the TX antennas and the Rx antennas are connected to those antennas through a duplexer.

Hereinafter, exemplary operations of a BS and an MS for determining beamforming vectors will be described in more detail with reference to the accompanying drawings. In the following description, the operations of the BS and the MS are described distinctively according to exemplary embodiments. One embodiment is a case where the BS and the MS follow the TDD scheme. Another embodiment is a case where the BS and the MS follow the FDD scheme.

Figure 3:
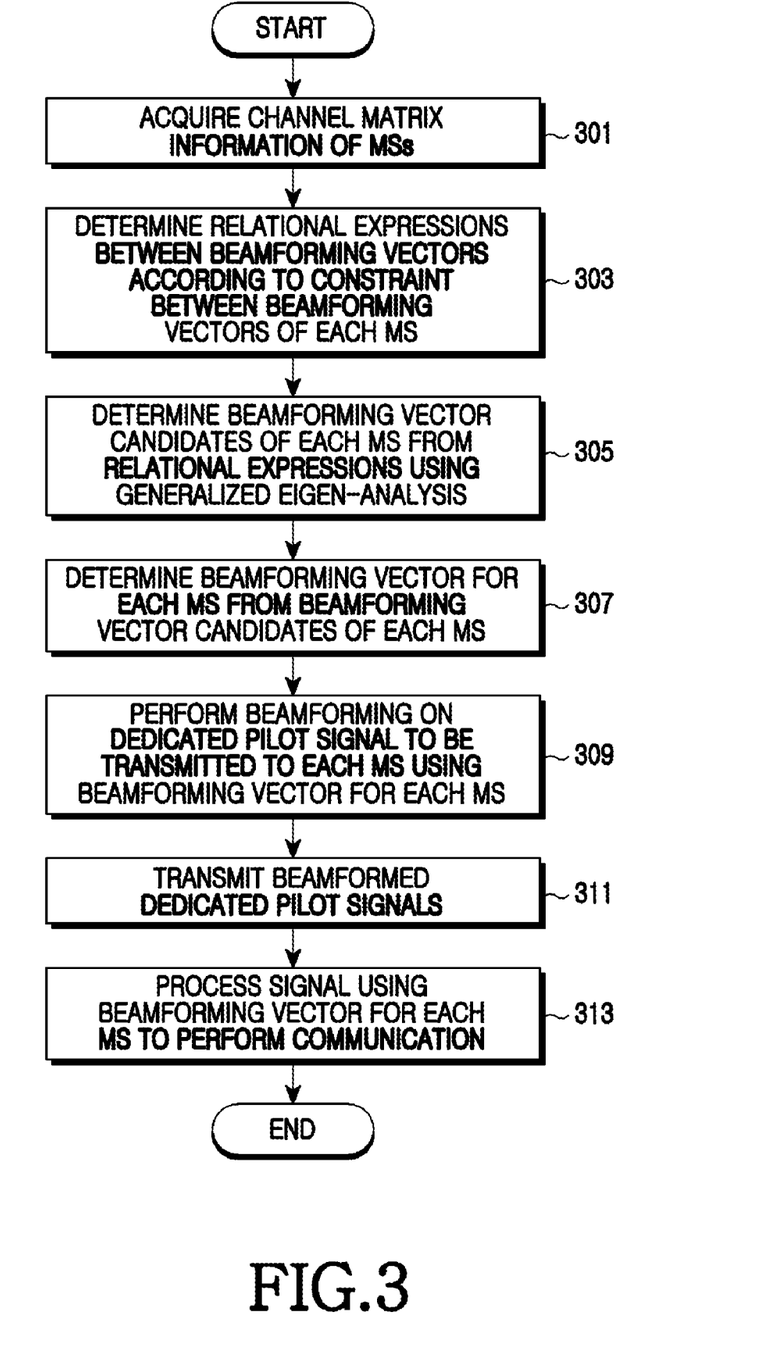
FIG. 3 is a flowchart illustrating an operation of a BS in a MIMO wireless communication system according to an exemplary embodiment of the present invention using a Time Division Duplexing (TDD) scheme.

FIG. 3 is a flowchart illustrating an operation of a BS in a MIMO wireless communication system according to an exemplary embodiment of the present invention using a TDD scheme.

Referring to FIG. 3, the BS acquires channel matrix information of MSs in step 301. In this case, the channel matrix information is acquired by estimating an uplink channel of the BS or by feeding back channel information of the MSs. In a case where the channel matrix information is acquired by estimating the uplink channel, the BS estimates a channel matrix using a sounding signal received through a sounding channel, and multiplies a Hermitian matrix of the channel matrix by the channel matrix to configure a matrix R. In a case where the channel matrix information is acquired by feeding back the channel information, the BS evaluates values of some elements of the matrix R from control information indicating the matrix R and received from the MSs, and restores values of all elements of the matrix R from the some elements according to a characteristic of the matrix R.

After acquiring the channel information, proceeding to step 303, the BS determines relational expressions between beamforming vectors according to a constraint between the beamforming vectors of each MS. In this case, the constraint is that there should be no interference between the beamforming vectors, and is expressed by Equation (4) above when two MSs are considered. In addition, when two MSs are considered, the relational expressions are substantially the same as shown in Equation (8) above.

After determining the relational expressions, proceeding to step 305, the BS determines beamforming vector candidates of each MS from the relational expressions using the generalized Eigen-analysis. In this case, a plurality of beamforming vector candidates are determined for each MS.

After determining the beamforming vector candidates of each MS, proceeding to step 307, the BS determines a beamforming vector for each MS from the beamforming vector candidates of each MS. In this case, the beamforming vector determined by the BS maximizes a sum rate. For example, when two MSs are considered, the BS determines the beamforming vector for each MS according to Equation (9) above. The determined beamforming vector for each MS is used as a Tx beamforming vector and an Rx beamforming vector.

After determining the beamforming vector for each MS, proceeding to step 309, the BS performs beamforming on dedicated pilot symbols to be transmitted to each MS using the beamforming vector selected in step 307 for each MS. That is, the BS multiplies a corresponding beamforming vector by each of the dedicated pilot symbols to be transmitted to each MS.

After performing beamforming on the dedicated pilot symbols, proceeding to step 311, the BS transmits the beamformed dedicated pilot symbols. In this case, the BS transmits the dedicated pilot symbols using a resource exclusively allocated to each MS.

After transmitting the beamformed dedicated pilot symbols, proceeding to step 313, the BS processes a signal using the beamforming vector for each MS and thus performs spatial multiple access communication. That is, the BS performs Tx beamforming on symbols transmitted to the MSs using the beamforming vector for each MS, and performs Rx beamforming on symbols received from the MSs using the beamforming vector for each MS.

Figure 4:
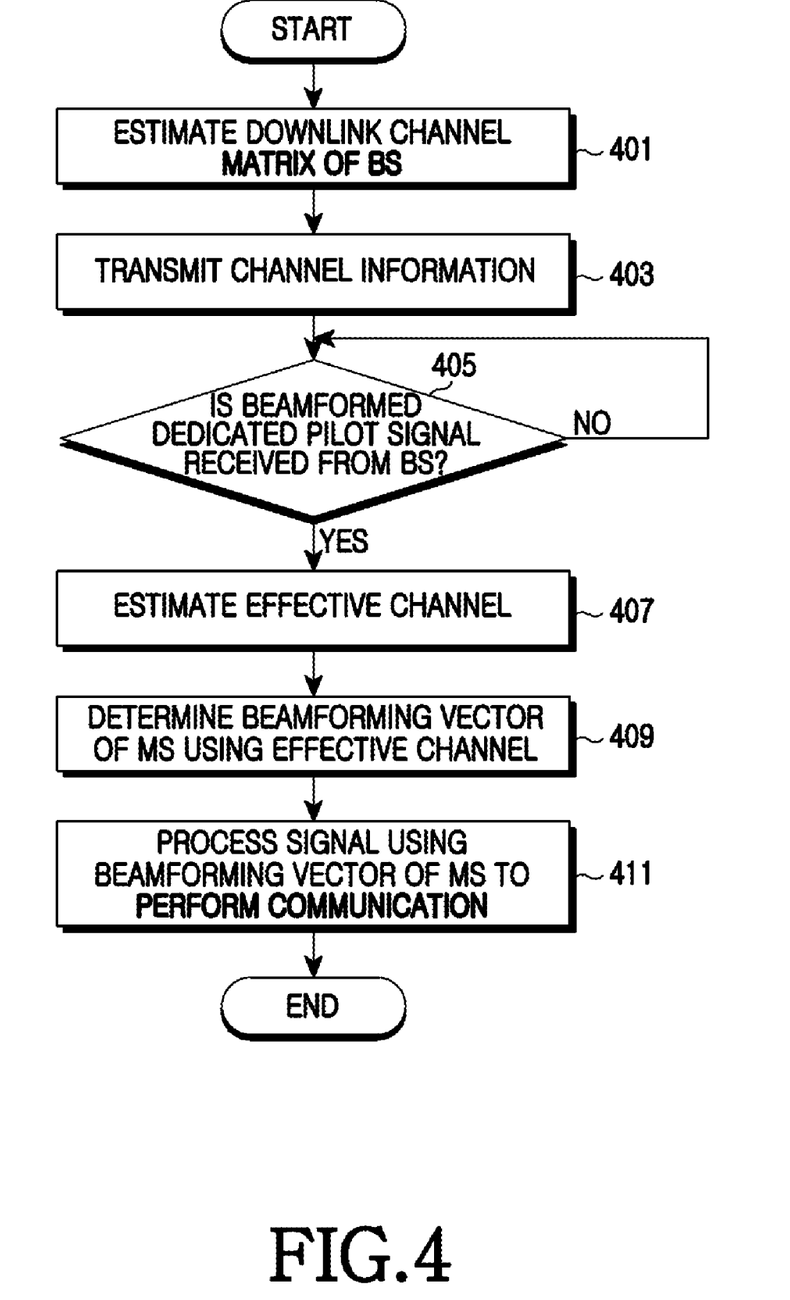
FIG. 4 is a flowchart illustrating an operation of an MS in a MIMO wireless communication system according to an exemplary embodiment of the present invention using a TDD scheme.

FIG. 4 is a flowchart illustrating an operation of an MS in a MIMO wireless communication system according to an exemplary embodiment of the present invention using a TDD scheme.

Referring to FIG. 4, the MS estimates a downlink channel matrix of a BS in step 401. For example, the MS estimates the downlink channel matrix of the BS using a preamble or a pilot symbol received from the BS.

After estimating the downlink channel matrix, proceeding to step 403, the MS transmits channel information. Herein, the channel information includes control information indicating a matrix R which is obtained by multiplying a Hermitian matrix of the downlink channel matrix and the downlink channel matrix. In this case, the MS generates control information indicating the matrix R with a minimum amount of information according to a characteristic of the matrix R. In other words, the MS generates control information including values of the remaining elements other than one element of the diagonal elements of the matrix R and including values of upper triangular elements or lower triangular elements of the non-diagonal elements. In addition, the MS transmits the control information generated in this manner to the BS.

After transmitting the channel information, proceeding to step 405, the MS determines whether a beamformed dedicated pilot signal is received from the BS. In this case, the dedicated pilot signal is received using a resource exclusively allocated to the MS.

Upon receiving the beamformed dedicated pilot signal, proceeding to step 407, the MS estimates an effective channel of the BS using the beamformed dedicated pilot signal. Herein, the effective channel is an actual channel multiplied by a beamforming vector used in the BS, and is expressed by Equation (2) above.

After estimating the effective channel, proceeding to step 409, the MS determines a beamforming vector of the MS using the effective channel. That is, the MS determines a Hermitian matrix of the effective channel and thus determines the beamforming vector of the MS. Herein, the determined beamforming vector is used as a Tx beamforming vector and an Rx beamforming vector.

After determining the beamforming vector of the MS, proceeding to step 411, the MS processes a signal using the beamforming vector and thus performs communication with the BS. That is, the MS performs Tx beamforming on symbols to be transmitted to the BS using the beamforming vector for each MS, and performs Rx beamforming on symbols received from the BS using the beamforming vector for each MS.

In the operation of the MS described with reference to FIG. 4, in step 403, the MS transmits the control information indicating the matrix R to acquire channel information of the BS. However, according to another exemplary embodiment for acquiring the channel information of the BS, that is, if the BS acquires channel information by estimating the uplink channel, step 403 is replaced with an operation of transmitting a sounding signal. That is, the MS transmits the sounding signal through a sounding channel in step 403.

Figure 5:
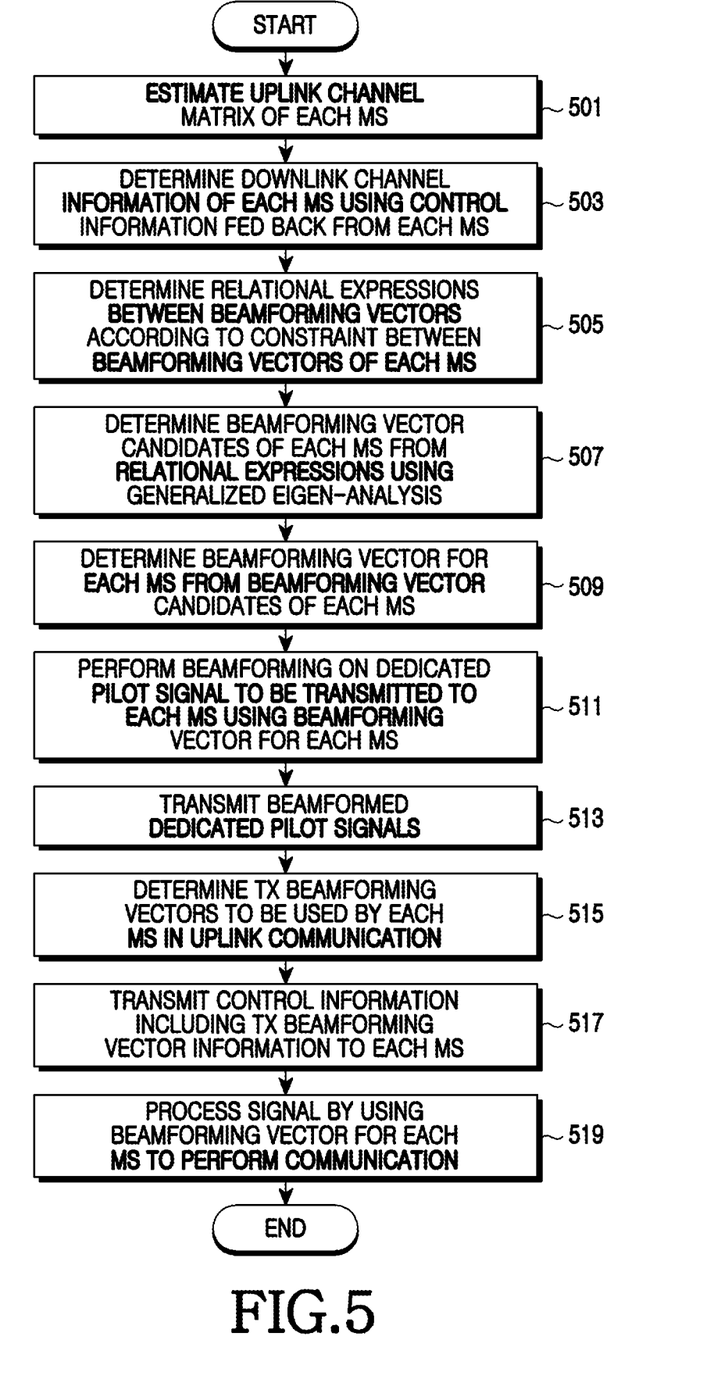
FIG. 5 is a flowchart illustrating an operation of a BS in a MIMO wireless communication system according to an exemplary embodiment of the present invention using a Frequency Division Duplexing (FDD) scheme.

FIG. 5 is a flowchart illustrating an operation of a BS in a MIMO wireless communication system according to an exemplary embodiment of the present invention using an FDD scheme.

Referring to FIG. 5, the BS estimates uplink channel matrixes of a plurality of MSs. That is, the BS estimates the uplink channel matrix of each MS using a sounding signal received from each MS through a sounding channel.

After estimating the uplink channel matrixes, proceeding to step 503, the BS determines downlink channel information of each MS using control information fed back from each MS. Herein, the channel information includes control information indicating a matrix R which is obtained by multiplying a Hermitian matrix of the downlink channel matrix of each MS and the downlink channel matrix. In this case, the BS determines values of some elements of the matrix R from control information indicating the matrix R and received from the MSs, and restores values of all elements of the matrix R from the some elements according to a characteristic of the matrix R.

After acquiring the uplink channel matrix information and the downlink channel information through step 501 to step 503, proceeding to step 505, the BS determines relational expressions between beamforming vectors according to a constraint between the beamforming vectors of each MS. In an exemplary implementation, the constraint is that there should be no interference between the beamforming vectors, and is expressed by Equation (6) above when two MSs are considered. In addition, when two MSs are considered, the relational expressions are substantially the same as shown in Equation (8) above. In this case, the BS independently determines relational expressions between Rx beamforming vectors and relational expressions between Tx beamforming vectors.

After determining the relational expressions, proceeding to step 507, the BS determines beamforming vector candidates of each MS from the relational expressions using the generalized Eigen-analysis. In this case, a plurality of beamforming vector candidates are determined for each MS, and Tx beamforming vector candidates and Rx beamforming vector candidates are independently determined.

After determining the beamforming vector candidates of each MS, proceeding to step 509, the BS determines a beamforming vector for each MS from the beamforming vector candidates of each MS. In an exemplary implementation, the beamforming vector determined by the BS maximizes a sum rate. For example, when two MSs are considered, the BS determines the beamforming vector for each MS according to Equation (9) above. The determined beamforming vector for each MS is used as a Tx beamforming vector and an Rx beamforming vector. In this case, the BS determines a Tx beamforming vector for each MS from Tx beamforming vector candidates of each MS, and determines an Rx beamforming vector for each MS among Rx beamforming vector candidates of each MS.

After determining the Tx beamforming vector and the Rx beamforming vector for each MS, proceeding to step 511, the BS performs beamforming on dedicated pilot symbols to be transmitted to each MS using the beamforming vector determined in step 509 for each MS. That is, the BS multiplies a corresponding beamforming vector by each of the dedicated pilot symbols to be transmitted to each MS.

After performing beamforming on the dedicated pilot symbols, proceeding to step 513, the BS transmits the beamformed dedicated pilot symbols. In this case, the BS transmits the dedicated pilot symbols using a resource exclusively allocated to each MS.

Thereafter, proceeding to step 515, the BS determines Tx beamforming vectors to be used by the respective MSs in uplink communication. That is, if the BS follows the FDD scheme, a Tx beamforming vector used by each MS in uplink communication is different from an Rx beamforming vector used by each MS in downlink communication. Therefore, unlike in a case where a specific MS and the BS follow the TDD scheme, the Tx beamforming vector to be used by the MS cannot be determined by the MS, and thus the BS determines the Tx beamforming vectors to be used by the respective MSs in uplink communication. For example, if a Tx beamforming vector to be used by an MS k is determined, the BS multiplies an Rx beamforming vector to be used for the MS k by the BS in uplink communication by an uplink channel matrix of the MS k, and determines its Hermitian matrix to determine the Tx beamforming vector to be used by the MS k.

After determining the Tx beamforming vector to be used by each MS, proceeding to step 517, the BS transmits control information including Tx beamforming vector information to each MS. For example, if the control information is transmitted to the MS k, the BS generates the control information including the Tx beamforming vector information to be used by the MS k in uplink communication, and transmits the control information to the MS k.

After transmitting the control information including the Tx beamforming vector information, proceeding to step 519, the BS processes a signal using the beamforming vector for each MS and thus performs spatial multiple access communication. That is, the BS performs Tx beamforming on symbols transmitted to the MSs using the Tx beamforming vector for each MS, and performs Rx beamforming on symbols received from the MSs using the Rx beamforming vector for each MS.

Figure 6:
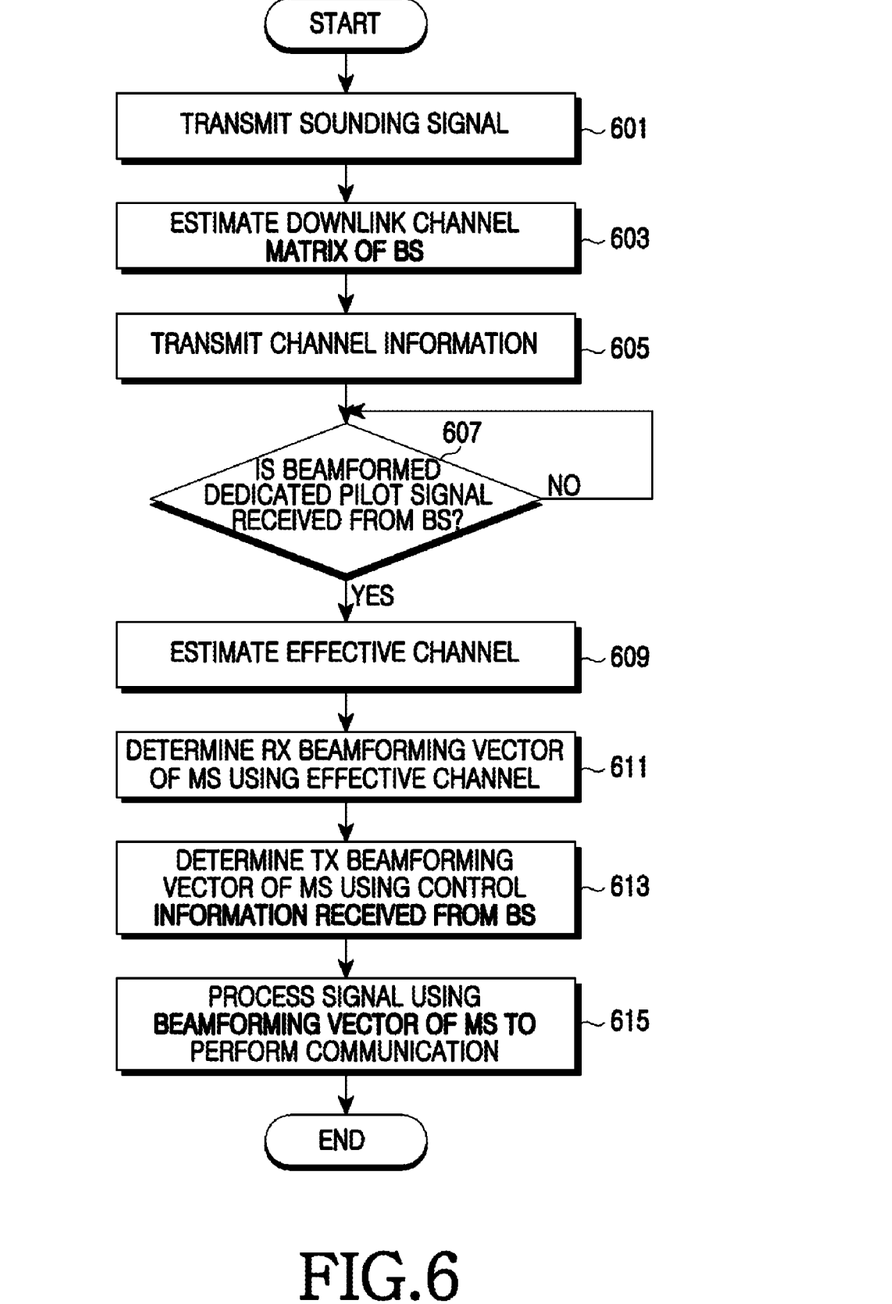
FIG. 6 is a flowchart illustrating an operation of an MS in a MIMO wireless communication system according to a second exemplary embodiment of the present invention using an FDD scheme.

FIG. 6 is a flowchart illustrating an operation of an MS in a MIMO wireless communication system according to an exemplary embodiment of the present invention using and FDD scheme.

Referring to FIG. 6, the MS transmits a sounding signal to a BS in step 601. In other words, to estimate an uplink channel matrix of the BS, the MS transmits the sounding signal through a sounding channel.

Thereafter, proceeding to step 603, the MS estimates a downlink channel matrix of the BS. In other words, the MS estimates the downlink channel matrix of the BS using a preamble or a pilot symbol received from the BS.

After estimating the downlink channel matrix, proceeding to step 605, the MS transmits channel information. Herein, the channel information includes control information indicating a matrix R which is obtained by multiplying a Hermitian matrix of the downlink channel matrix and the downlink channel matrix. In this case, the MS generates control information indicating the matrix R with a minimum amount of information according to a characteristic of the matrix R. In other words, the MS generates control information including values of the remaining elements other than one element of the diagonal elements of the matrix R and including values of upper triangular elements or lower triangular elements of the non-diagonal elements. In addition, the MS transmits the control information generated in this manner to the BS.

After transmitting the channel information, proceeding to step 607, the MS determines whether a beamformed dedicated pilot signal is received from the BS. In this case, the dedicated pilot signal is received using a resource exclusively allocated to the MS.

Upon receiving the beamformed dedicated pilot signal, proceeding to step 609, the MS estimates an effective channel of the BS using the beamformed dedicated pilot signal. Herein, the effective channel is an actual channel multiplied by a beamforming vector used in the BS, and is expressed by Equation (2) above.

After estimating the effective channel, proceeding to step 611, the MS determines a beamforming vector of the MS using the effective channel. That is, the MS determines a Hermitian matrix of the effective channel and thus determines the beamforming vector of the MS.

Thereafter, proceeding to step 613, the MS determines a Tx beamforming vector of the MS using control information received from the BS. That is, since an uplink channel and a downlink channel are different from each other, a Tx beamforming vector used by the MS in uplink communication can be determined by the MS. Therefore, the MS determines the Tx beamforming vector of the MS using the control information received from the BS.

After determining the beamforming vector of the MS, proceeding to step 615, the MS processes a signal using the beamforming vector and thus performs communication with the BS. That is, the MS performs Tx beamforming on symbols to be transmitted to the BS using the beamforming vector for each MS, and performs Rx beamforming on symbols received from the BS using the beamforming vector for each MS.

According to exemplary embodiments of the present invention, a MIMO wireless communication system determines a Tx beamforming vector through generalized Eigen-analysis and determines an Rx beamforming vector by estimating an effective channel matrix. Therefore, MIMO communication can be achieved without interference between MSs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Base Station (BS) apparatus in a Multiple Input Multiple Output (MIMO) wireless communication system, the apparatus comprising:
    a calculator for determining relational expressions between beamforming vectors of Mobile Stations (MSs) using channel information of each MS, for determining beamforming vector candidates of each MS from the relational expressions using generalized Eigen-analysis, and for determining beamforming vectors for each MS among the beamforming vector candidates; and
    a plurality of Transmit (Tx) beamformers for performing Tx beamforming on dedicated pilot symbols to be transmitted to each MS using the beamforming vectors for each MS,
    wherein the relational expressions represent algebraic functions comprising beamforming vectors of at least two MSs as variables and the channel information of the at least two MSs.

2. The apparatus of claim 1, wherein the channel information comprises a matrix R which is a product between a Hermitian matrix of a channel matrix of the MS and the channel matrix.

3. The apparatus of claim 2, wherein the calculator determines the beamforming vectors for each MS among the beamforming vector candidates of each MS so that the determined beamforming vectors maximize a sum rate.

4. The apparatus of claim 3, further comprising:
    an estimator for estimating uplink channel matrixes of each MS using sounding signals received from each MS and for providing information on the uplink channel matrixes to the calculator,
    wherein the calculator configures matrixes R of each MS using the uplink channel matrixes of each MS.

5. The apparatus of claim 4, wherein the plurality of Tx beamformers perform Tx beamforming on Tx symbols using a beamforming vector determined for each MS according to the matrixes R configured from the uplink channel matrixes.

6. The apparatus of claim 4, further comprising:
    a plurality of Receive (Rx) beamformers for performing Rx beamforming on Rx symbols using a beamforming vector determined for each MS according to the matrixes R configured from the uplink channel matrixes.

7. The apparatus of claim 3, further comprising:
an analyzer for determining information indicating the matrix R from control information received from each MS.

8. The apparatus of claim 7,
wherein the information indicating the matrix R corresponds to values of some elements of the matrix R, and
wherein the analyzer restores values of all elements of the matrix R using the values of some elements according to a characteristic of the matrix R.

9. The apparatus of claim 8, further comprising:
a plurality of Rx beamformers for performing Rx beamforming on Rx symbols using a beamforming vector determined for each MS according to the matrix R evaluated by the control information.

10. The apparatus of claim 8, wherein the plurality of Tx beamformers perform Tx beamforming on Tx symbols using a beamforming vector determined for each MS according to the matrix R evaluated by the control information.

11. A Mobile Station (MS) apparatus in a Multiple Input Multiple Output (MIMO) wireless communication system, the apparatus comprising:
an estimator for estimating an effective channel of a Base Station (BS) using beamformed dedicated pilot symbols;
a calculator for determining a Receive (Rx) beamforming vector of the MS using the effective channel; and
an Rx beamformer for performing Rx beamforming on Rx symbols using the Rx beamforming vector,
wherein the dedicated pilot symbols are beamformed using a transmit (TX) beamforming vector that is determined by generalized Eigen-analysis on relational expressions between beamforming vectors of at least two MSs, and
wherein the relational expressions represent algebraic functions comprising beamforming vectors of the at least two MSs as variables and the channel information of the at least two MSs.

12. The apparatus of claim 11, wherein the calculator determines the Rx beamforming vector by determining a Hermitian matrix of the effective channel.

13. The apparatus of claim 12,
wherein the calculator determines a Transmit (Tx) beamforming vector by determining the Hermitian matrix of the effective channel, and
further comprising:
a Tx beamformer for performing Tx beamforming on Tx symbols using the Tx beamforming vector.

14. The apparatus of claim 11, further comprising:
a generator for generating a sounding signal for an uplink channel estimation of the BS; and
a plurality of mappers for mapping the sounding signal to a sounding channel.

15. The apparatus of claim 11, further comprising:
a generator for generating control information indicating a matrix R which comprises a product between a Hermitian matrix of a downlink channel matrix and the downlink channel matrix; and
a plurality of mappers for mapping the control information to a resource allocated for control information transmission.

16. The apparatus of claim 15, wherein the generator generates control information comprising at least one value of at least one diagonal element other than one diagonal element among diagonal elements of the matrix R and comprising at least one of at least one value of at least one upper triangular element and at least one value of at least one lower triangular element among the non-diagonal elements of the matrix R.

17. The apparatus of claim 11, further comprising:
an analyzer for determining a Tx beamforming vector of the MS from control information received from the BS; and
a Tx beamformer for performing Tx beamforming on Tx symbols using the Tx beamforming vector determined from the control information.

18. A method of operating a Base Station (BS) in a Multiple Input Multiple Output (MIMO) wireless communication system, the method comprising:
determining relational expressions between beamforming vectors of Mobile Stations (MSs) using channel information of each MS;
determining beamforming vector candidates of each MS from the relational expressions using generalized Eigen-analysis;
determining beamforming vectors for each MS from the beamforming vector candidates; and
performing Transmit (Tx) beamforming on dedicated pilot symbols to be transmitted to each MS using the beamforming vectors for each MS,
wherein the relational expressions represent algebraic functions comprising beamforming vectors of at least two MSs as variables and the channel information of the at least two MSs.

19. The method of claim 18, wherein the channel information comprises a matrix R which is a product between a Hermitian matrix of a channel matrix of the MS and the channel matrix.

20. The method of claim 19, wherein the beamforming vectors for each MS are determined among the beamforming vector candidates of each MS so that the determined beamforming vectors maximize a sum rate.

21. The method of claim 20, further comprising:
estimating uplink channel matrixes of each MS using sounding signals received from each MS; and
configuring matrixes R using the uplink channel matrixes.

22. The method of claim 21, further comprising:
performing Tx beamforming on Tx symbols using a beamforming vector determined for each MS according to the matrixes R configured from the uplink channel matrixes.

23. The method of claim 21, further comprising:
performing Receive (Rx) beamforming on Rx symbols using a beamforming vector determined for each MS according to the matrixes R configured from the uplink channel matrixes.

24. The method of claim 20, further comprising:
determining information indicating the matrix R from control information received from each MS.

25. The method of claim 24,
wherein the information indicating the matrix R corresponds to values of some elements of the matrix R, and
further comprising restoring values of all elements of the matrix R using the values of some elements according to a characteristic of the matrix R.

26. The method of claim 25, further comprising:
performing Rx beamforming on Rx symbols using a beamforming vector determined for each MS according to the matrix R evaluated by the control information.

27. The method of claim 25, further comprising:
performing Tx beamforming on Tx symbols using a beamforming vector determined for each MS according to the matrix R evaluated by the control information.

28. A method of operating a Mobile Station (MS) in a Multiple Input Multiple Output (MIMO) wireless communication system, the method comprising:

estimating an effective channel of a Base Station (BS) using beamformed dedicated pilot symbols;

determining a Receive (Rx) beamforming vector of the MS using the effective channel; and performing Rx beamforming on Rx symbols using the Rx beamforming vector, wherein the dedicated pilot symbols are beamformed using a transmit (TX) beamforming vector that is determined by generalized Eigen-analysis on relational expressions between beamforming vectors of at least two MSs, and wherein the relational expressions represent algebra functions comprising beamforming vectors of the at least two MSs as variables and the channel information of the at least two MSs.

29. The method of claim 28, wherein the determining of the Rx beamforming vector comprises determining the Rx beamforming vector by determining a Hermitian matrix of the effective channel.

30. The method of claim 29, further comprising:
determining a Transmit (Tx) beamforming vector by determining the Hermitian matrix of the effective; and
performing Tx beamforming on Tx symbols using the Tx beamforming vector.

31. The method of claim 29, further comprising:
transmitting a sounding signal for an uplink channel estimation of the BS through a sounding channel.

32. The method of claim 29, further comprising:
transmitting control information indicating a matrix R which comprises a product between a Hermitian matrix of a downlink channel matrix and the downlink channel matrix.

33. The method of claim 32, wherein the control information comprises at least one value of at least one diagonal element other than one diagonal element among diagonal elements of the matrix R and comprises at least one of at least one value of at least one upper triangular element and at least one value of at least one lower triangular element among the non-diagonal elements of the matrix R.

34. The method of claim 29, further comprising:
determining a Tx beamforming vector of the MS from control information received from the BS; and
performing Tx beamforming on Tx symbols using the Tx beamforming vector evaluated using the control information.

* * * * *